United States Patent [19]
Clancey

[11] 3,809,197
[45] May 7, 1974

[54] VISCOUS COUPLING

[75] Inventor: Stephen M. Clancey, Battle Creek, Mich.

[73] Assignee: Eaton Corporation, Cleveland, Ohio

[22] Filed: Nov. 10, 1972

[21] Appl. No.: 305,376

[52] U.S. Cl. .............................. 192/58 B, 192/82 T
[51] Int. Cl. ................................................ F16d 35/00
[58] Field of Search ....................... 192/58 B, 82 T

[56] References Cited
UNITED STATES PATENTS

| | | | |
|---|---|---|---|
| 3,512,622 | 5/1970 | Sutaruk | 192/58 B |
| 3,575,269 | 4/1971 | Sherman | 192/58 B |
| 3,584,716 | 6/1971 | Coty | 192/58 B |
| 3,690,428 | 9/1972 | Laflame | 192/58 B |
| 3,741,359 | 6/1973 | Leichliter | 192/58 B |

*Primary Examiner*—Allan D. Herrmann
*Attorney, Agent, or Firm*—Teagno & Toddy

[57] ABSTRACT

A coupling for driving a cooling fan device associated with a vehicle may be located so that ram air impinges directly thereon. The coupling comprises relatively rotatable input and output coupling members. The output coupling member defines a chamber within which said input coupling member rotates. The input and output coupling members have a plurality of interdigitated lands and grooves which define a shear space therebetween and which are cooperable with viscous shear fluid in the shear space to transmit torque therebetween. A reservoir chamber 15 defined by said output member and means for directing viscous fluid from said shear space into said reservoir chamber is provided. Temperature-responsive valve means controls flow of viscous fluid from the reservoir chamber into the shear space and includes a temperature-sensing device located forwardly on said output member in the ram air stream. All of the lands and grooves on the output member are located on a forward position thereof which is directly in said ram air stream and all of the cooperating lands and grooves on the input member are located on a forward portion thereof to thereby provide effective heat dissipation due to their location relative to the ram air stream. Means is provided for directing viscous fluid flow radially of the input and output members to distribute viscous fluid to the outer peripheral lands and grooves including two radially extending rectangular-shaped channels in the output member, and which are located diametrically opposite each other. The means for directing viscous fluid radially further includes three radially extending V-shaped channels in the input member and intersecting the lands and grooves thereon. The V-shaped channels and the rectangular-shaped channels are located such that on relative rotation of the input and output members, they periodically axially align to provide a large fluid flow area for directing viscous fluid radially thereof.

10 Claims, 5 Drawing Figures

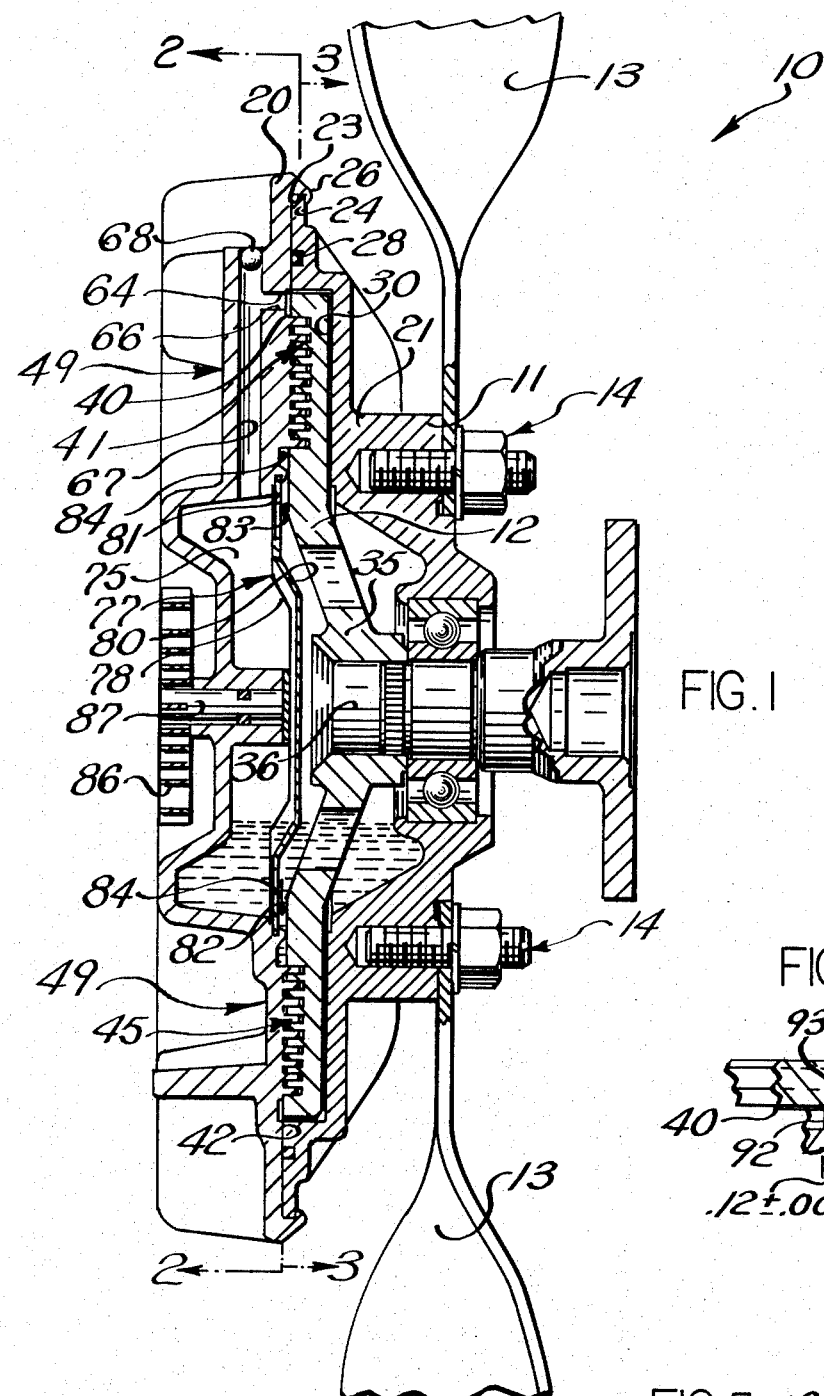
FIG. 1
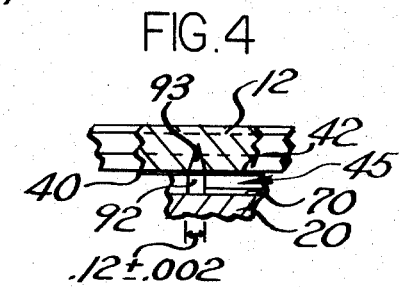
FIG. 4
FIG. 5

VISCOUS COUPLING

The present invention relates to drive couplings of the type embodying a fluid medium for transmitting torque between relatively rotatable input and output coupling members, and more particularly relates to a shear-type fluid drive coupling wherein a fluid shear medium transmits torque between the relatively rotatable input and output coupling members. Fluid couplings of the type to which the present invention relates are usable for driving various different kinds of load devices and have particular utility for driving an engine accessory such as the cooling fan device of an internal combustion engine.

BACKGROUND OF THE INVENTION

Such drive couplings for driving the cooling fan for an internal combustion engine are well known. Typically, such drive couplings include input and output members which have interdigitated portions or lands and grooves which are spaced closely adjacent each other with a fluid shear medium positioned in the space therebetween. The fluid shear medium functions to transmit the drive from the input member to the output member on which the fan device is mounted. The advantages of using a viscous shear drive coupling for driving a fan device are well known.

Also, certain known viscous drive couplings include a mechanism for controlling the amount of viscous shear fluid in the shear space so as to control the amount of drive transmitted between the input and output members. If there is no viscous shear fluid in the space between the input and output members, no drive is transmitted therebetween. On the other hand if all of the shear space is filled with viscous shear fluid a maximum torque is transmitted between the input and output members. Of course at intermediate levels of viscous fluid in the shear space an intermediate degree of torque transmission is provided. In view of the fact that the torque transmitted between the input and output members is related to the amount of viscous shear fluid in the shear space, the mechanisms for controlling the amount of viscous shear fluid in the shear space provide a control for fan speed.

U.S. Pat. No. 3,055,473 and U.S. Pat. No. 3,263,783 are typical of one type of mechanism which is utilized for controlling the amount of fluid in the shear space. These patents are constructed so that fluid is pumped from the shear space into a reservoir chamber. The flow of fluid from the reservoir chamber back into the shear space is controlled by a temperature control valve device. In the event that high engine cooling requirements are required the valve device is opened so that the fluid flows into the shear space to provide a maximum amount of torque transmission to the fan mounted on the output member. In the event minimum or no cooling requirements are necessary, the valve device is closed so that no fluid will flow into the shear space from the reservoir chamber. Of course, the cooling requirements vary as a function of different conditions such as the temperature of the atmosphere and also the speed of the vehicle. For example, under very cold winter conditions the temperature-sensing device may operate the valve so that no fluid flows into the shear space and therefore the fan speed is reduced to a minimum, whereas under extremely high temperatures the viscous shear space may be filled.

The development of the viscous shear drive couplings has progressed to the point where heavy duty drive couplings capable of transmitting relatively high torque are constructed. The afore-mentioned U.S. Pat. No. 3,273,783 discloses one such coupling which has a large torque transmitting area provided by a relatively large number of lands and grooves on the input member and the output member.

Heat dissipation in such fluid couplings, particularly heavy duty couplings is extremely important to effective and efficient coupling operation, for well-known reasons. The heat dissipation is important for one reason due to the fact that the viscous fluid breaks down under high temperature conditions. The effective dissipation of heat is also important, since the better the dissipation, the less visous fluid may be used for providing a given amount of torque output which is extremely advantageous, since the less viscous fluids are much more stable and have a longer and more durable life.

In U.S. Pat. No. 3,263,783 the torque transmitting lands and grooves are provided on both sides of the input member and they cooperate with spaced lands and grooves on axial spaced portions on the output member. The lands which are located on the forward portion of the output member and also on the forward face of the input member are located directly in the flow of the stream of air which flows through the radiator of the vehicle and thus the viscous fluid therein is cooled thereby. The lands on the rear side of the coupling are not so located and less effective heat dissipation therefore is provided. In addition, cooling fins are provided for effecting heat dissipation.

SUMMARY OF THE INVENTION

The present invention is directed to a heavy duty high performance viscous drive coupling which is particularly capable of providing a high output torque making it useful in a truck or other heavy duty vehicle for driving the engine cooling fan or other accessories. In order to take advantage of the heat dissipation provided by the ram air, all of the drive grooves and lands which are formed on the input and output members are located on the forward side of the input member and output member so that the ram air directly impinges on the output member in the area where the torque transmission is being effected as opposed to U.S. Pat. No. 3,263,783 where the lands and grooves are on opposite sides of the input member. This construction combined with the use of cooling fins provides highly effective heat dissipation.

As a result of this construction, it has been necessary in the present invention to increase the radial dimension of the coupling with, of course, the beneficial result of an increase in the drive area in proportion thereto. Since the drive lands and grooves are all located on the forward portion of the viscous coupling not only is the heat dissipation substantially increased but also the coupling is similified in construction. The improved heat dissipation is believed to be a result of the fact that not only are the torque drive transmitting areas located in a direct ram air stream but also the drive grooves and lands which are interdigitated act as cooling fins to effect a cooling of the torque transmitting fluid as they rotate in the fluid. In addition, the construction eliminates the need for any structure providing for drawing fluid from the side of the input member remote from the forward side thereof, and more specifically fluid passages in the input member for purposes of flowing such fluid therethrough into the reservoir chamber are not necessary.

In developing the improved fluid coupling noted hereinabove having the substantially improved heat dissipation, it has been necessary to make special provision for directing the fluid to the drive grooves which are located on the forward side of the input member. This problem centers on the fact that it is difficult to get fluid into the radial outermost portion of the lands and grooves quickly enough to provide a satisfactory and rapid response by the coupling. In this connection, it has been necessary to provide on both the input and output members radial channels which extend from the reservoir chamber outwardly of the drive lands and grooves and which channels direct fluid radially of the drive coupling. In order to provide a sufficient flow of fluid radially outwardly, it has been necessary to provide three relatively large V-grooves on the input coupling member and which intersect and cut through the drive transmitting grooves thereon at three spaced locations therearound. It has also been necessary to cut two relatively large radially extending channels across the drive grooves in the output coupling member and which have been made in a rectangular configuration in order to provide a substantial flow area for the radial flow of fluid outwardly of the coupling member. These drive grooves upon rotation of the input and output coupling members, periodically align and when aligned do provide a substantial channel area for the flow of fluid radially outwardly of the coupling. In addition, the fact that a different number of channels is provided on the input and output member is important, since such staggers the interaction locations so that only one set of channels is axially aligned at a time. A large flow area, such as if all channels align simultaneously, has been found to be detrimental to keeping the viscous fluid in the lands and grooves.

DESCRIPTION OF THE DRAWINGS

Further objects and advantages of the present invention will be apparent to those skilled in the art to which it relates from the following detailed description thereof made with reference to the accompanying drawings in which:

FIG. 1 is a cross-sectional view illustrating a viscous coupling embodying the present invention;

FIG. 4 is a somewhat enlarged sectional view illustrating portions of the viscous coupling of FIG. 1 in an operating position; and FIG. 5 is a fragmentary enlarged sectional view of a portion of the viscous coupling of FIG. 1.

DESCRIPTION OF PREFERRED EMBODIMENT

Figure 2:
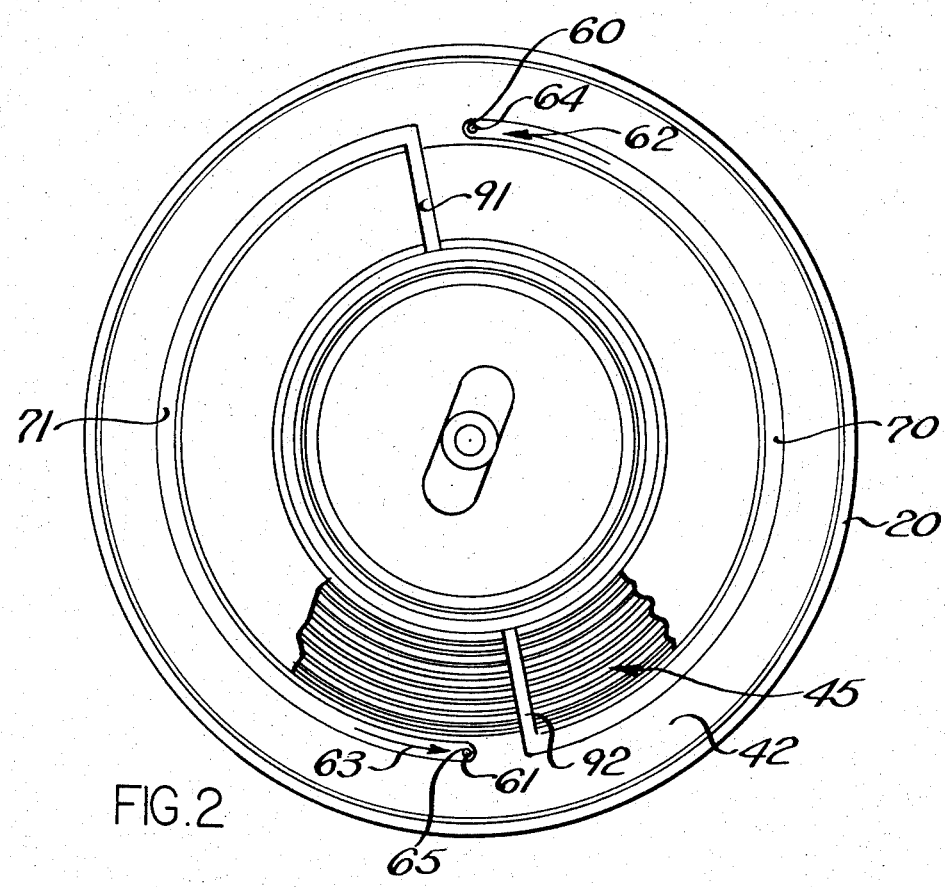
FIG. 2 is a view of a portion of the viscous coupling taken approximately along line 2—2 of FIG. 1 and illustrating the face of the output coupling member which contains the drive grooves.
Figure 3:
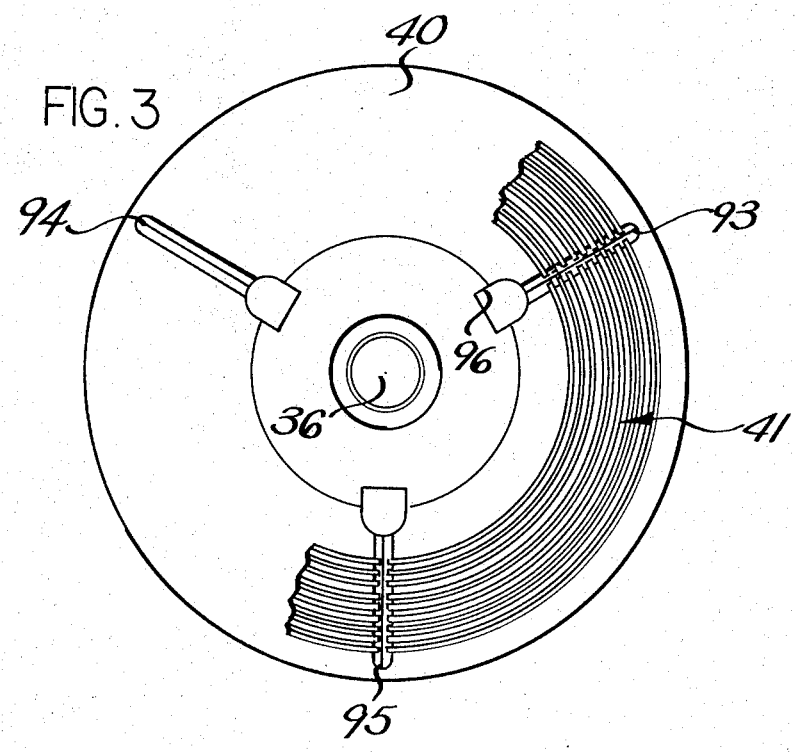
FIG. 3 is a view taken approximately along the line 3—3 of FIG. 1 illustrating the face of the input coupling member which contains the drive grooves.

The present invention provides an improved heavy duty viscous drive coupling 10. The viscous coupling 10 includes an output member 11 and an input member 12. The output member 11 has fan blades 13 secured thereto by means of fastener assemblies 14. The fan blades are adapted to rotate and provide a flow of cooling air across an engine with which the fan is associated.

The output member 11 is made in two parts which, for purposes of this application, are termed a forward coupling member 20 and a rear coupling member 21. The forward coupling member 20 is formed with a pilot portion having a surface 23 which extends peripherally therearound and which guides the outer portion 24 of the rear housing member 21 into assembled position therewith. When the housing members 20, 21 are guided together into the position illustrated in FIG. 1 the portion 26 of the pilot portion of the forward coupling member 20 is bent over in order to secure the forward and rear coupling members 20 and 21 together. A suitable gasket type O-ring seal 28 is provided between the coupling members 20 and 21 in order to prevent leakage of viscous shear fluid therebetween.

The output coupling member 11, constructed of the assembled forward and rear coupling members 20, 21 defines a chamber generally designated 30 in which the input coupling member 12 rotates. The input coupling member 12 is a disc shaped member which has a hub portion 35. The hub portion 35 is suitably fixedly secured on a shaft 36 which comprises the input shaft for driving the input coupling member 12. The shaft 36 may be driven in any suitable manner as by a pulley not shown which is driven by a belt from the crankshaft of the engine with which the viscous coupling 10 is associated.

The input coupling member 12 and the output coupling 11 have cooperating shear surfaces thereon which are spaced very closely to each other and a viscous shear medium in the space between the shear surfaces transmits torque from the input member 12 to the output member 11 so that the output member 11 rotates due to torque transmission through the viscous shear fluid.

In the embodiment illustrated, the torque transmitting surfaces on the input and output coupling members, are in the form of a plurality of lands and grooves. More specifically, a series of lands and grooves are formed on the forward face 40 of the input member 12 and are generally designated 41. Cooperating lands and grooves are formed on the face 42 of the forward coupling member 20 and the lands and grooves on the forward coupling member 20 are generally designated 45. The lands and grooves 45 on the forward coupling member 20 cooperate wth the lands and grooves 41 on the input coupling member 12 and are in effect interdigitated as shown in FIG. 1 when assembled. The lands and grooves are very closely spaced and provide a substantial area for the transmission of torque between the input and output coupling members in view of the relatively large number. In fact there nine projecting lands on the output member which project into nine grooves on the input member and eight lands on the input member projecting into eight grooves on the output member.

The cooperating lands and grooves 41 and 45 are located in a direct line with the ram air which impinges against the front face of the forward coupling member 20. As a result, the lands and grooves 41, 45 which effect the torque transmission are located as closely as possible to the ram air as indicated by arrows 49. There is a substantial amount of heat dissipation due to such location of all of the lands and grooves. This is a substantial improvement over designs having lands and grooves on the rear face of an input coupling member and cooperating lands and grooves on a mating rear part, out of the ram air stream. It should also be apparent that there is a substantial number of cooperating lands and grooves and these provide a substantial torque transmitting surface area so that the viscous coupling has a substantial torque transmitting capability. This enables the viscous coupling to be readily used for the driving of fan blades for example, in a truck or other heavy duty vehicle.

As is known, the amount of torque transmitted between the drive grooves 41 and 45 to drive the fan 13 is a function of the amount of fluid in the viscous shear space between the interdigitated lands and grooves 41 and 45. The viscous coupling of the present invention is provided with a construction where the amount of viscous shear fluid in that shear space can be varied, due to requirements for fan cooling. This is effected generally by the use of a mechanism for pumping viscous fluid from the shear space and a temperature sensing valve mechanism for controlling the flow and fluid back into the shear space to be described hereinbelow.

The viscous shear fluid may be pumped from the shear space by the action of a pair of pumping surfaces designated 60 and 61 which are formed on the face 42 of the forward coupling member 20. Pumping surfaces 60 and 61 are surfaces located in the path of flow of fluid as it is dragged around the coupling member 20 by the rotation of the input member 12. More specifically, and referring to FIG. 2, it should be apparent that as the input coupling member 12 rotates relative the output coupling member 11, viscous shear fluid is dragged around or flowed in the direction of the arrow 62 and impinges the surface 60 and in the direction of the arrow 63 and impinges with the surface 61. The surfaces 60, 61 extend generally perpendicular to the face 42, lie in a radial plane, and extend axially of the forward coupling member 20. This impingement against the surfaces 60, 61 creates a pressure adjacent the openings 64 and 65 respectively in the output coupling member 11. The openings 64 and 65 communicate with respective axially extending passages, one of which is shown in FIG. 1 and designated 66 and is in communication with the opening 64. The passage 66 communicates with a radially extending passageway in the forward input member 20 and which is designated 67. The passageway 67 is sealed at its radial outer end by a suitable means such as a plug or pressed in ball, designated 68. A similar radial flow passageway (not shown) cooperates with the opening 65.

The openings 64 and 65 are formed at one end of arcuate channels 70 and 71 respectively in the face 42 of the forward coupling member 20. The channels 70, 71 each extend approximately 168° around the output member, and are approximately 0.19 inches wide. The channels 70 and 71 are fairly shallow (0.045±0.015 inches) and viscous fluid is moved in those channels in the direction of the arrows 62, 63 due to the movement or rotation of the input coupling member 12 relative to the output coupling member 11. When the fluid impinges against the surfaces 60 and 61, it then flows through the passageways associated with those openings and into a central chamber or a reservoir chamber designated 75 in FIG. 1. The reservoir chamber 75 comprises an annular chamber which encircles the axis of rotation of the input 12 and output 11 coupling members and provides for the storage of viscous shear fluid therein. The volume of that chamber is such that substantially all of the viscous shear fluid in the coupling may be stored therein.

The viscous shear fluid, as noted hereinabove, flows into the shear space defined by the lands and grooves 41 and 45 under the control of a temperature respeonsive valve mechanism generally designated 77. The valve mechanism 77 specifically controls the flow of viscous fluid from the reservoir 75 into the shear space.

The valve mechanism 77 includes a valve member 78 which cooperates with a plate 80 which defines one side of the reservoir chamber 75. The plate 80 is suitably secured to the forward coupling member 20 around the periphery of the plate 80 and thereby defines the rear side of the reservoir chamber 75. The plate 80 has a pair of openings 81, and 82 therein and the valve member 78 extends radially relative to the plate 80 and is positionable in an overlying position with respect to the openings 81 and 82. It should be apparent, of course, that if the valve member 78 closes the openings 81 and 82, the fluid may not flow from the reservoir chamber 75 outwardly thereof through the openings. In the event, however, the valve member 78 is moved so that the openings 81 and 82 are opened, fluid may flow from the reservoir 75 through those openings and into an area designated 83 in the drawings and from that area the fluid is thrown by centrifugal force outwardly into the shear space between the lands and grooves 41 and 45, as illustrated by the arrows designated 84 in FIG. 1.

The valve member 78 is moved relative to the plate 80 and relative to the openings 81 and 82 therein by a temperature sensing bi-metallic spring element 86 which is suitably mounted in a conventional manner on the housing member 20 and which is connected with a shaft 87. The shaft 87 on its inner end is suitably connected to the valve member 78. The temperature sensing bi-metallic spring element 86 is of a type which when it senses a change in the ambient temperature surrounding it, it effects a rotation of the shaft member 87, and the shaft member 87 in turn effects a movement of the valve member 78 relative to the plate 80. The specific temperature responsive valve device is similar to the valve device disclosed in U.S. pat. No. 3,263,783 and reference may be made thereto for further details of construction and operation.

From the above, it should be apparent that if it is desired to reduce the amount of fluid in the shear space between the lands and grooves 41 and 45, it is necessary only to effect a movement of the valve member 78 into a position blocking the flow of fluid from the reservoir chamber 75 into the area 83 immediately adjacent thereto. This occurs when the temperature sensing bimetal element 86 senses a low temperature and therefore a reduction in the cooling required of the fane 13. The opening 80, 81 will be closed or their open area reduced minimizing flow into the shear space. As a result, the rotation of the input member 12 will cause fluid to be dragged or moved relative to the surface 60 and 61 through the channels 70 and 71 respectively and the fluid will then flow through the openings 64 and 65 and into the reservoir chamber 25. As a esult, there will be a net reduction in fluid in the shear space and therefore a reduction in the torque transmitted to the fan blades 13. In the event that it is desired to increase the torque transmitted to the fan blades 13, it is necessary then to increase the amount of fluid in the shear space, defined by the lands and grooved 41 and 45 respectively. As a result, the openings 81 and 82 must flow a greater amount of fluid into the shear space than that which is being flowed from the shear space due to he action of the surface 60 and 61. Therefore, the openings 81 and 82 must be opened by the valve member 78 in order to enable a sufficient flow of fluid into the shear space to occur so that there is a net gain in the fluid added to the shear space.

As is noted hereinabove, the viscous coupling 10 embodying the present invention is provided with all of its drive grooves on the forward side of the input coupling member 12 and thereby the drive lands and grooves 41, 45 are located in the direct flow of ram air which impinges on the forward coupling member 20. While it should be apparent from the above that there is substantial heat dissipation due to their location of the lands and grooves 41, 45, it should be equally apparent that for a given output torque the radial dimension of the coupling is increased over a coupling having lands and grooves on both sides of the input member. Accordingly, it has been necessary in the disclosed construction to make special provision for the handling of or the flow of viscous fluid radially outwardly of the coupling in order that the outer peripheral grooves receive the viscous fluid rapidly enough in order to make the drive coupling efficient in its operation and rapid in its response.

To this end, the forward coupling member 20 is specifically provided with a pair of fluid flow grooves designated 91 and 92 in FIG. 2. The groove 91 extends outwardly at a diametrically opposite location from the groove 92. The groove 91 extends outwardly and intersects with the channel 71 at the end of the channel 71 opposite the end having the surface 61. The groove 92 likewise extends outwardly and intersects the channel 70 at the end thereof opposite the surface 60 with which the channel is associated. The grooves 91, 92, as best shown in FIG. 4, are both of substantially rectangular cross section in order to provide for a maximum amount of fluid flow radially outwardly therethrough. It should be apparent, of course, that the channels 91 and 92 intersect the grooves 45 and the fluid in the channels 92 readily may flow into the shear space provided between the various lands and grooves. The grooves 91, 92 as best shown in FIG. 5, extend to a greater depth than the torque transmitting lands and grooves 45. The dimension of the grooves 91, 92 is important to providing proper flow rates. The depth of the channel 70 is approximately 0.045 ± 0.015 inches. The width of the grooves 91, 92 is approximately 0.12 ± 0.002 inches and the depth at the land portion designated Y is approximately 0.165 ± 0.017 inches. Accordingly, the cross sectional area of a groove is approximately 0.0198 in.$^2$ and since there are two such grooves 0.0396 in.$^2$ (2 times 0.0198 in.$^2$) is provided as a radial flow path in the member 20.

The input member 11 and particularly the forward face thereof which has the lands and grooves 41 therein, is also provided with radially extending passageways for directing shear fluid radially outwardly of the input member. The input member specifically includes three such passageways designated 93, 94 and 95 and which are located at circumferentially equally spaced locations. The channels 93–95 are V shaped as shown in FIG. 4 and the outer ends of the channels 93–95 have a width substantially equal to the width of the rectangularly spaced channels 91 and 92 in the output member 20. The channels 93, 94 and 95 at their inner periphery intersect with openings generally designated 96 which provide for flow of fluid between the opposite sides of the input member 12. Each of the V shaped channels 93–95 have a width at their open end of approximately 0.149 inches and have a depth measured perpendicular to the face 40 of 0.165 ± 0.008 inches. This provides a flow cross section area of approximately 0.0124 inches square. The three channels provide a flow area three times that amount or approximately 0.0372 inches square, which is approximately the same as the flow area provided by channels 91, 92 in the output member 20.

When the viscous coupling 10, as shown in FIG. 1, is at rest all of the viscous shear fluid takes a position in the lower part of the coupling as illustrated in FIG. 1. Upon rotation thereof, the viscous shear fluid is dragged around the periphery of the coupling by the rotation and due to centrifugal force, the viscous shear fluid flows outwardly into the shear space. Once located in the shear space, the viscous shear fluid, due to the pumping action described above of the surfaces 61 and 60, flows into the reservoir chamber 75 and the flow of fluid from the reservoir chamber 75 is under the control of the valve member. As the input member 11 rotates relative to the output member 20, viscous shear fluid in the shear space between the interdigitated lands and grooves transmits torque from the input member to the output member to effect a rotation of the fan blades 13. As this rotation occurs, periodic alignment occurs between the channels 93, 94 and 95 and the channels 91 and 92 on the output member. When this occurs, as shown in FIG. 4, a substantially large passageway for the radial flow of fluid is provided in order to direct a sufficient flow of fluid outwardly of the reservoir chamber 75 and thereby fill the grooves and land areas at the outer periphery of the input and output member. These channels provide for flow radially outwardly at all times not only when aligned, and provide for rapid response due to flow from the reservoir chamber 75 and also during initial startup.

In view of the above, it should be apparent that applicant has provided a substantially improved coupling having high heat dissipation characteristics which enables a more stable viscous fluid to be used therein for providing a given torque output and which also is constructed to provide for heavy duty operation with rapid response.

Have described my invention, I claim:

1. A heavy-duty fluid coupling for driving a cooling fan device associated with a vehicle and which is positionable so that ram air impinges directly thereon, said coupling comprising relatively rotatable input and output coupling members, said output coupling member defining a chamber within which said input coupling member rotates, said input and output coupling members having a plurality of lands and grooves which define a shear space therebetween and which are cooperable with viscous shear fluid in the shear space to transmit torque therebetween, a reservoir chamber defined by said output member, means for directing viscous fluid from said shear space into said reservoir chamber including surface portions on said output member against which said viscous fluid impinges due to rotation of said input member relative to said output member, temperature-responsive valve means for controlling flow of viscous fluid from said reservoir chamber into said shear space and including a temperature-sensing device located forwardly on said output member in the ram air stream, all of said lands and grooves on said output member being located on a forward portion thereof which is directly in said ram air stream and all of the cooperating lands and grooves on said input member being located on a forward portion thereof to thereby provide effective heat dissipation, said lands on said output member being nine in number and extending circumferentially and being radially spaced by said grooves thereon, and means for directing viscous fluid flow radially of said input and output members to distribute viscous fluid to the outer peripheral lands and grooves including two radially extending rectangular-shaped channels in said output member, said radially extending rectangular-shaped channels being located diametrically opposite each other and each having a cross-sectional flow area in the order of 0.0198 square inches, said means for directing viscous fluid radially further including three radially extending V-shaped channels in said input member and intersecting the lands and grooves thereon, said V-shaped channels each having a cross-sectional area in the order of .012 square inches, said rectangular-shaped channels having a depth greater than the depth of said drive-transmitting grooves on said output member and said V-shaped channels having a depth greater than the depth of said drive-transmitting grooves on said input member, and said V-shaped channels and said rectangular-shaped channels being located such that on relative rotation of said input and output members they periodically axially align to provide a large fluid flow area for directing viscous fluid radially thereof, each of said rectangular-shaped channels terminating at and communicating with one end of an arcuate channel extending arcuately around the face of said output coupling member having said lands and grooves and spaced radially outwardly of said lands and grooves, and said surface portions against which fluid is impinged comprises surfaces defining the ends of said arcuate channels opposite the ends communicating with said rectangular channels.

2. A fluid coupling as defined in claim 1 wherein said V-shaped channels at their radially inner ends communicate with openings extending axially through said input member.

3. A fluid coupling as defined in claim 1 wherein said output member comprises a forward output member and a rear output member, said forward output member defining said reservoir chamber and carrying a partition member sealing one side of said reservoir chamber, said partition member having at least one opening therein for communicating fluid from the reservoir chamber into said shear space, said valve means controlling viscous fluid flow through said one opening, and said rectangular shaped channels extending from the area adjacent the opening where the flow leaves the reservoir chamber.

4. A coupling for driving a cooling fan device associated with a vehicle and which may be located so that ram air impinges directly thereon, said coupling comprising relatively rotatable input and output coupling members, said output coupling member defining a chamber within which said input coupling member rotates, said input and output coupling members having a plurality of interdigitated lands and grooves which define a shear space therebetween and which are cooperable with viscous shear fluid in the shear space to transmit torque therebetween, a reservoir chamber defined by said output member, means for directing viscous fluid from said shear space into said reservoir chamber including surface portions on said output member against which said viscous fluid impinges due to rotation of said input member relative to said output member, temperature-responsive valve means for controlling flow of viscous fluid from said reservoir chamber into said shear space and including a temperature-sensing device located forwardly on said output member in the ram air stream, all of said lands and grooves on said output member being located on a forward portion thereof which is directly in said ram air stream and all of the cooperating lands and grooves on said input member being located on a forward portion thereof to thereby provide effective heat dissipation, said lands extending circumferentially and being radially spaced by said grooves and means for directing viscous fluid flow radially of said input and output members to distribute viscous fluid flow to the outer peripheral lands and grooves including a plurality of radially extending rectangular-shaped channels in said output member, said radially extending rectangular-shaped channels being located diametrically opposite each other, said means for directing viscous fluid radially further including a plurality of radially extending V-shaped channels in said input member and intersecting the lands and grooves thereon, and said V-shaped channels and said rectangular-shaped channels being located such that on relative rotation of said input and output members they periodically axially align to provide a large fluid flow area for directing viscous fluid radially thereof.

5. A fluid coupling as defined in claim 4 wherein each of said rectangular-shaped channels has a cross sectional flow area in the order of 0.0198 square inches.

6. A fluid coupling as defined in claim 4 wherein each of said rectangular-shaped channels terminate at and communicate with one end of an arcuate channel extending arcuately around the face of said output coupling member having said lands and grooves and spaced radially outwardly of said lands and grooves, and said surface portions against which fluid is impinged comprises surfaces defining the ends of said arcuate channels opposite the ends communicating with said rectangular channels.

7. A fluid coupling as defined in claim 4 wherein said rectangular-shaped channels have a depth greater than the depth of said drive-transmitting grooves on said output member and said V-shaped channels have a depth greater than the depth of said drive-transmitting grooves on said input member.

8. A fluid coupling as defined in claim 4 wherein said rectangular-shaped channels have a depth greater than the depth of said drive-transmitting grooves on said output member and said V-shaped channels have a depth greater than the depth of said drive-transmitting grooves on said input member, each of said rectangular-shaped channels terminate at and communicate with one end of an arcuate channel extending arcuately around the face of said output coupling member having said lands and grooves and spaced radially outwardly of said lands and grooves, and said surface portions against which fluid is impinged comprises surfaces defining the ends of said arcuate channels opposite the ends communicating with said rectangular channels.

9. A fluid coupling as defined in claim 8 wherein said arcuate channels extend approximately 168° around said output member.

10. A coupling for driving a cooling fan device associated with a vehicle and which may be located so that ram air impinges directly thereon, said coupling comprising relatively rotatable input and output coupling members, said output coupling member defining a chamber within which said input coupling member rotates, said input and output coupling members having a plurality of interdigitated lands and grooves which define a shear space therebetween and which are cooperable with viscous shear fluid in the shear space to transmit torque therebetween, a reservoir chamber defined by said output member, means for directing viscous fluid from said shear space into said reservoir chamber including surface portions on said output member against which said viscous fluid impinges due to rotation of said input member relative to said output member, temperature-responsive valve means for controlling flow of viscous fluid from said reservoir chamber into said shear space and including a temperature-sensing device located forwardly on said output member in the ram air stream, all of said lands and grooves on said output member being located on a forward portion thereof which is directly in said ram air stream and all of the cooperating lands and grooves on said input member being located on a forward portion thereof to thereby provide effective heat dissipation, said lands extending circumferentially and being radially spaced by said grooves and means for directing viscous fluid flow radially of said input and output members to distribute viscous fluid flow to the outer peripheral lands and grooves including a plurality of radially extending channels in said output member, said radially extending channels being located diametrically opposite each other, said means for directing viscous fluid radially further including a plurality of radially extending channels in said input member and intersecting the lands and grooves thereon, and the number of said channels on one member being different than the number of channels on the other member so that on relative rotation of said input and output members said channels on said members periodically axially align at different times.

* * * * *